US010345903B2

(12) United States Patent
Robbins et al.

(10) Patent No.: US 10,345,903 B2
(45) Date of Patent: Jul. 9, 2019

(54) FEEDBACK FOR OPTIC POSITIONING IN DISPLAY DEVICES

(71) Applicant: Microsoft Technology Licensing, LLC, Redmond, WA (US)

(72) Inventors: Steve Robbins, Bellevue, WA (US); Scott C. McEldowney, Redmond, WA (US); Xinye Lou, Redmond, WA (US); David D. Bohn, Fort Collins, CO (US); Quentin Simon Charles Miller, Sammamish, WA (US); David Nister, Bellevue, WA (US); Gerhard Schneider, Seattle, WA (US); Christopher Maurice Mei, Seattle, WA (US); Nathan Ackerman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 526 days.

(21) Appl. No.: 13/973,788

(22) Filed: Aug. 22, 2013

(65) Prior Publication Data
US 2015/0035744 A1 Feb. 5, 2015

Related U.S. Application Data

(63) Continuation of application No. 13/954,864, filed on Jul. 30, 2013, now abandoned.

(51) Int. Cl.
*G06F 3/01* (2006.01)
*G02B 27/01* (2006.01)
(Continued)

(52) U.S. Cl.
CPC ......... *G06F 3/016* (2013.01); *G02B 27/0093* (2013.01); *G02B 27/017* (2013.01);
(Continued)

(58) Field of Classification Search
CPC . G06F 3/016; G02B 27/0093; G02B 27/0172; G02B 2027/0125; G02B 2027/0127; G06K 9/00604
See application file for complete search history.

(56) References Cited

U.S. PATENT DOCUMENTS 4,365,872 A * 12/1982 Nunokawa ............. A61B 3/156
351/208
4,711,512 A  12/1987 Upatnieks
(Continued)

FOREIGN PATENT DOCUMENTS

CN  1433735 A  8/2003
CN  101051349 A  10/2007
(Continued)

OTHER PUBLICATIONS

Minier, V. et al., "Diffraction Characteristics of Superimposed Holographic Gratings in Planar Optical Waveguides," IEEE Photonics Technology Letters, vol. 4, No. 10, Oct. 1992, 4 pages.
(Continued)

*Primary Examiner* — Joseph Suh
(74) *Attorney, Agent, or Firm* — Alleman Hall Creasman & Tuttle LLP

(57) ABSTRACT

A method of detecting eye location for a head-mounted display system includes directing positioning light to an eye of a user and detecting the positioning light reflected from the eye of the user. The method further includes determining a distance between the eye and a near-eye optic of the head-mounted display system based on attributes of the detected positioning light, and providing feedback for adjusting the distance between the eye and the near-eye optic.

15 Claims, 6 Drawing Sheets

(51) Int. Cl.
*G06K 9/00* (2006.01)
*G02B 27/00* (2006.01)

(52) U.S. Cl.
CPC ..... *G02B 27/0172* (2013.01); *G02B 27/0179* (2013.01); *G06K 9/00604* (2013.01); *G02B 2027/014* (2013.01); *G02B 2027/0125* (2013.01); *G02B 2027/0127* (2013.01); *G02B 2027/0138* (2013.01); *G02B 2027/0178* (2013.01); *G02B 2027/0185* (2013.01); *G02B 2027/0187* (2013.01)

(56) References Cited

U.S. PATENT DOCUMENTS

| | | | | |
|---|---|---|---|---|
| 5,151,722 | A * | 9/1992 | Massof | G02B 27/017 351/158 |
| 5,684,497 | A * | 11/1997 | Hildebrand | G02B 17/0808 345/7 |
| 5,815,126 | A * | 9/1998 | Fan | G02B 27/017 345/7 |
| 5,856,842 | A | 1/1999 | Tedesco | |
| 6,147,805 | A * | 11/2000 | Fergason | G02B 27/0172 359/630 |
| 6,323,970 | B1 | 11/2001 | Popovich | |
| 6,419,671 | B1 * | 7/2002 | Lemberg | A61B 3/103 606/11 |
| 6,487,021 | B1 | 11/2002 | Ophey | |
| 6,580,529 | B1 | 6/2003 | Amitai et al. | |
| 6,683,584 | B2 * | 1/2004 | Ronzani | G02B 27/017 345/8 |
| 6,753,828 | B2 | 6/2004 | Tuceryan et al. | |
| 7,184,615 | B2 | 2/2007 | Levola | |
| 7,576,916 | B2 | 8/2009 | Amitai | |
| 8,160,411 | B2 | 4/2012 | Levola et al. | |
| 8,233,204 | B1 | 7/2012 | Robbins et al. | |
| 8,355,208 | B1 * | 1/2013 | Baker | G02B 27/0176 345/8 |
| 8,611,014 | B2 | 12/2013 | Valera et al. | |
| 8,817,350 | B1 | 8/2014 | Robbins et al. | |
| 9,185,352 | B1 * | 11/2015 | Jacques | H04N 7/18 |
| 2004/0061831 | A1 | 4/2004 | Aughey et al. | |
| 2004/0080467 | A1 * | 4/2004 | Chinthammit | G06F 3/011 345/7 |
| 2004/0252277 | A1 * | 12/2004 | Chmielewski, Jr. | A61B 3/113 351/209 |
| 2005/0169572 | A1 * | 8/2005 | Itoh | G02B 26/108 385/15 |
| 2006/0025832 | A1 * | 2/2006 | O'Keeffe | A61N 1/0553 607/46 |
| 2006/0110008 | A1 * | 5/2006 | Vertegaal | G06K 9/00604 382/103 |
| 2006/0195014 | A1 * | 8/2006 | Seibel | A61B 1/0008 600/102 |
| 2007/0041684 | A1 | 2/2007 | Popovich et al. | |
| 2007/0291277 | A1 * | 12/2007 | Everett | A61B 3/102 356/497 |
| 2009/0228197 | A1 * | 9/2009 | Tsuchikawa | G01C 21/26 701/532 |
| 2010/0001926 | A1 * | 1/2010 | Amirparviz | A61B 5/1455 345/7 |
| 2010/0060551 | A1 * | 3/2010 | Sugiyama | G02B 26/06 345/8 |
| 2010/0073469 | A1 * | 3/2010 | Fateh | A61H 5/00 348/62 |
| 2010/0079865 | A1 | 4/2010 | Saarikko et al. | |
| 2011/0091856 | A1 * | 4/2011 | Ruf | G09B 23/28 434/271 |
| 2011/0279666 | A1 * | 11/2011 | Strombom | A61B 3/113 348/78 |
| 2012/0019645 | A1 * | 1/2012 | Maltz | G02B 7/287 348/78 |
| 2012/0019891 | A1 * | 1/2012 | Dewell | G02F 1/163 359/275 |
| 2012/0127062 | A1 * | 5/2012 | Bar-Zeev | G02B 3/14 345/6 |
| 2012/0212484 | A1 * | 8/2012 | Haddick | G02B 27/0093 345/419 |
| 2012/0249952 | A1 * | 10/2012 | Sakagawa | A61B 3/0075 351/206 |
| 2012/0287040 | A1 | 11/2012 | Moore et al. | |
| 2013/0016320 | A1 * | 1/2013 | Naba | A61B 3/102 351/208 |
| 2013/0033485 | A1 * | 2/2013 | Kollin | G06F 1/1637 345/419 |
| 2013/0038510 | A1 * | 2/2013 | Brin | G02B 27/017 345/8 |
| 2013/0050642 | A1 | 2/2013 | Lewis et al. | |
| 2013/0050833 | A1 | 2/2013 | Lewis et al. | |
| 2013/0063340 | A1 * | 3/2013 | Mondragon | G09G 5/00 345/156 |
| 2013/0077049 | A1 | 3/2013 | Bohn | |
| 2013/0114850 | A1 * | 5/2013 | Publicover | G06K 9/00604 382/103 |
| 2013/0187961 | A1 * | 7/2013 | Hunt | G02B 27/0093 345/697 |
| 2014/0055569 | A1 * | 2/2014 | Jeon | H04N 13/204 348/47 |
| 2014/0104665 | A1 | 4/2014 | Popovich et al. | |
| 2014/0140653 | A1 | 5/2014 | Brown et al. | |
| 2014/0140654 | A1 | 5/2014 | Brown et al. | |
| 2014/0192321 | A1 * | 7/2014 | Cheng | A61B 3/14 351/206 |
| 2014/0204455 | A1 | 7/2014 | Popovich et al. | |
| 2014/0247208 | A1 * | 9/2014 | Henderek | G06F 3/0481 345/156 |
| 2014/0306612 | A1 * | 10/2014 | Woodgate | F21V 23/0471 315/153 |
| 2014/0333665 | A1 * | 11/2014 | Sylvan | G02B 27/0149 345/633 |
| 2014/0361957 | A1 * | 12/2014 | Hua | G06F 3/013 345/8 |
| 2014/0375541 | A1 * | 12/2014 | Nister | G06F 3/013 345/156 |
| 2015/0077312 | A1 * | 3/2015 | Wang | G02B 27/017 345/7 |
| 2015/0198808 | A1 * | 7/2015 | Morifuji | G09G 5/38 345/8 |
| 2016/0034029 | A1 * | 2/2016 | Lyons | G06F 3/013 715/748 |

FOREIGN PATENT DOCUMENTS

| | | |
|---|---|---|
| CN | 102928979 A | 2/2013 |
| CN | 103033936 A | 4/2013 |
| JP | 2013037021 A | 2/2013 |
| WO | 2012172295 A1 | 12/2012 |
| WO | 2014209706 A1 | 12/2014 |

OTHER PUBLICATIONS

Pu, A. et al., "Exposure Schedule for Multiplexing Holograms in Photopolymer Films," Optical Engineering, vol. 35, No. 10, Oct. 1996, 6 pages.

Han, X. et al., "Accurate Diffraction Efficiency Control for Multiplexed Volume Holographic Gratings," Optical Engineering, vol. 41, No. 11, Available Online Oct. 2002, 13 pages.

Yan, A. et al., "Multiplexing Holograms in the Photopolymer with Equal Diffraction Efficiency," Advances in Optical Data Storage Technology, SPIE vol. 5643, Nov. 2004, 9 pages.

Massenot, S. et al., "Multiplexed Holographic Transmission Gratings Recorded in Holographic Polymer-Dispersed Liquid Crystals: Static and Dynamic Studies," Applied Optics, vol. 44, No. 25, Sep. 2005, 8 pages.

Zharkova, G. et al., "Study of the Dynamics of Transmission Gratings Growth on Holographic Polymer-Dispersed Liquid Crystals," International Conference on Methods of Aerophysical Research, ICMAR 2008, Jun. 2008, 4 pages.

(56) References Cited

OTHER PUBLICATIONS

Kress, B. et al., "Exit Pupil Expander for Wearable See-Through Displays," Photonic Applications for Aerospace, Transportation, and Harsh Environment IIII, SPIE vol. 8368, Apr. 2012, 8 pages.
Hansen, D. et al., "In the Eye of the Beholder: A Survey of Models for Eyes and Gaze," IEEE Transactions on Pattern Analysis and Machine Intelligence, vol. 32, No. 3, Mar. 2010, pp. 478-500.
ISA European Patent Office, International Search Report & Written Opinion for PCT Patent Application No. PCT/US2014/048337, Nov. 24, 2014, 11 Pages.
Owen, et al., "Display Relative Calibration for Optical See-Through Head-Mounted Displays", Retrieved at <<http://ieeexplore.ieee.org/stamp/stamp.jsp?tp=&arnumber=1383044>>, In Third IEEE and ACM International Symposium on Mixed and Augmented Reality, Nov. 2, 2004, pp. 9.
IPEA European Patent Office, Written Opinion Issued in Application No. PCT/US2014/048337, Jun. 22, 2015, WIPO, 6 pages.
IPEA European Patent Office, International Preliminary Report on Patentability issued in Application No. PCT/US2014/048337, dated Oct. 26, 2015, WIPO, 11 pages.
"Office Action Issued in European Patent Application No. 14750128. 2", dated Sep. 4, 2017, 7 Pages.
"First Office Action and Search Report Issued in Chinese Patent Application No. 201480042885.X", dated May 28, 2018, 13 Pages.
"Second Office Action Issued in Chinese Patent Application No. 201480042885.X", dated Jan. 30, 2019, 11 Pages.

\* cited by examiner

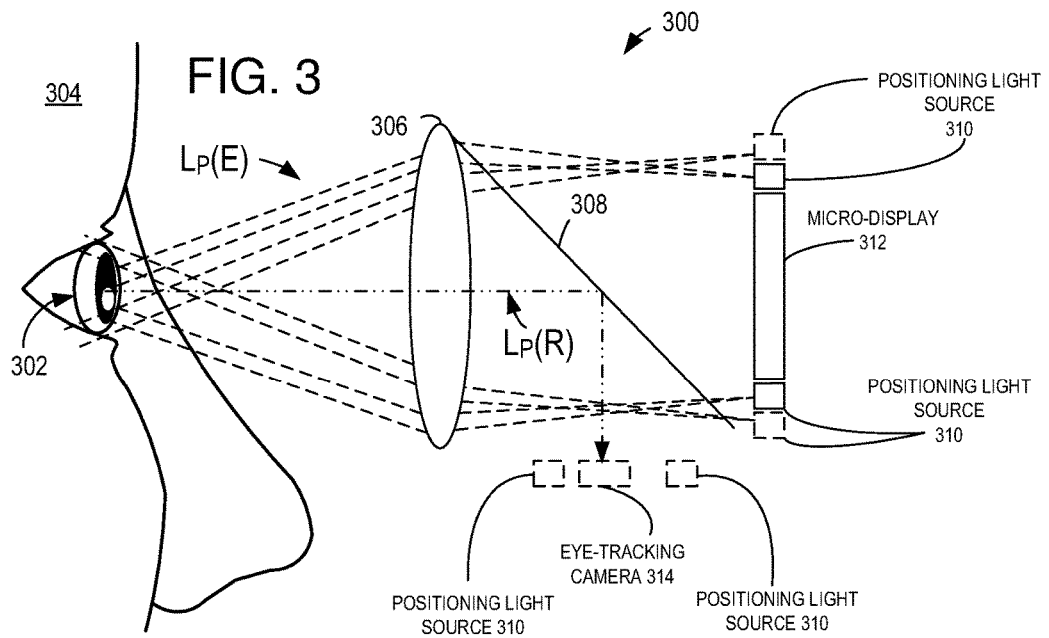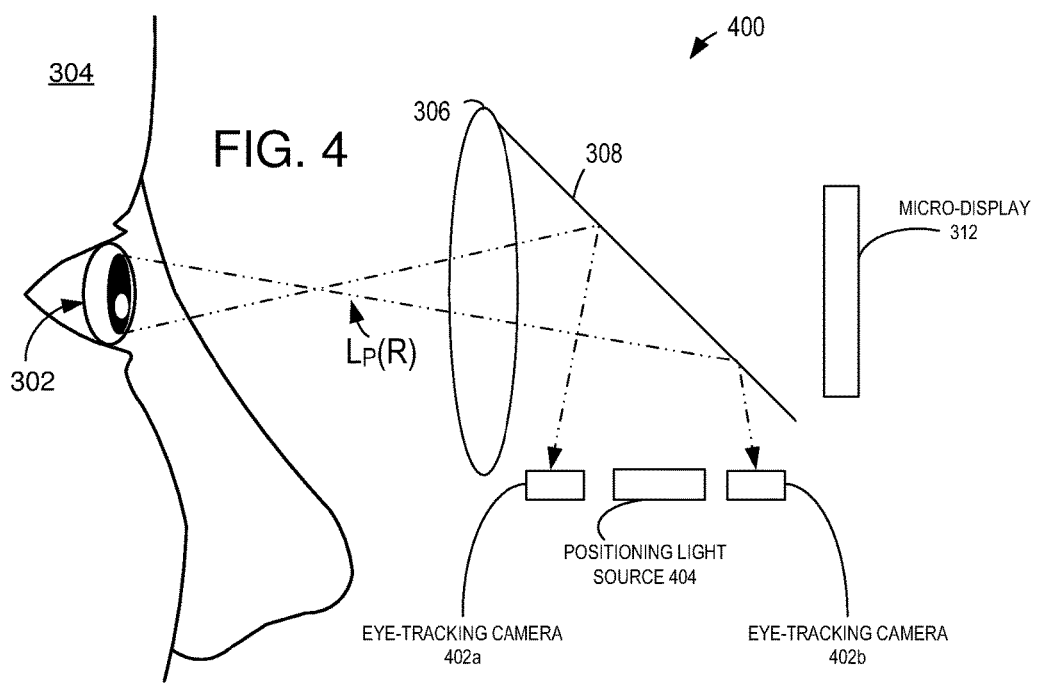

FEEDBACK FOR OPTIC POSITIONING IN DISPLAY DEVICES

CROSS-REFERENCE TO RELATED APPLICATIONS

This application is a continuation of U.S. patent application Ser. No. 13/954,864 filed Jul. 30, 2013 and titled "NEAR-EYE OPTIC POSITIONING IN DISPLAY DEVICES", the entire disclosure of which is hereby incorporated by reference for all purposes.

BACKGROUND

Near-eye display devices are configured to present images to a user via a display that is positioned close to the user's eyes. For example, a see-through head-mounted augmented reality display device may be worn on a user's head to position a near-eye display directly in front of a user's eyes. An appearance of objects displayed on the near-eye display may be altered responsive to changes in distance between the user's eyes and the near-eye optics of the displays.

SUMMARY

Embodiments are disclosed herein that relate to aligning a near-eye display of a see-through head-mounted display device with an eye of a user. For example, one disclosed embodiment provides, on a see-through head-mounted display device, a method comprising directing positioning light to an eye of a user, and detecting the positioning light reflected from the eye of the user. The method further comprises determining a distance between the eye and a near-eye optic of the head-mounted display system based on attributes of the detected positioning light in order to determine whether the near-eye optic is misaligned with a target optic location. The method includes providing feedback for adjusting the distance between the eye and the near-eye optic in order to assist the user in positioning the near-eye optic in the target optic location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 schematically shows a see-through display optic and optical paths for directing positioning light to an eye of a user in accordance with an embodiment of the present disclosure.

FIG. 4 schematically shows a see-through display optic and optical paths for receiving positioning light at one or more cameras in accordance with an embodiment of the present disclosure.

DETAILED DESCRIPTION

A see-through head-mounted display device including a near-eye display may use various optical systems to deliver an image to a user's eye, including but not limited to projection-based systems and waveguide-based systems. However, the optical systems of such near-eye displays may have relatively small exit pupils. Further, in some near-eye displays, optical performance may decay toward the edge of the exit pupil.

As such, a near-eye display device may include an adjustable fit system to allow a user to properly locate the exit pupil of the system. This may allow a user to adjust the system to avoid optical effects caused by misalignment. However, the proper adjustment of such a fit system may pose challenges for users. As a result, some users may perform sufficient fit adjustments to find a coarse fit that provides an acceptable level of performance, and then not perform additional adjustment to further optimize viewing. Thus, such viewers may not enjoy the full viewing experience offered by the device.

Accordingly, embodiments are disclosed herein that relate to assisting users in adjusting a see-through head-mounted display device. Briefly, the disclosed embodiments determine from image data a distance between the location of an eye of a user and a near-eye optic of a see-through head-mounted display device, and determine an adjustment to make to the see-through head-mounted display device that aligns the near-eye optic with a target optic location. The determined adjustment may be performed automatically and/or output as a recommendation for the user to perform manually. This may help to simplify adjusting the near-eye display system to more precisely align the see-through head-mounted display device with the user's eye or eyes. It will be understood that reference herein to a location of an eye may signify a location of the overall eye structure, the pupil of the eye, and/or any other anatomical feature of the eye.

Figure 1:
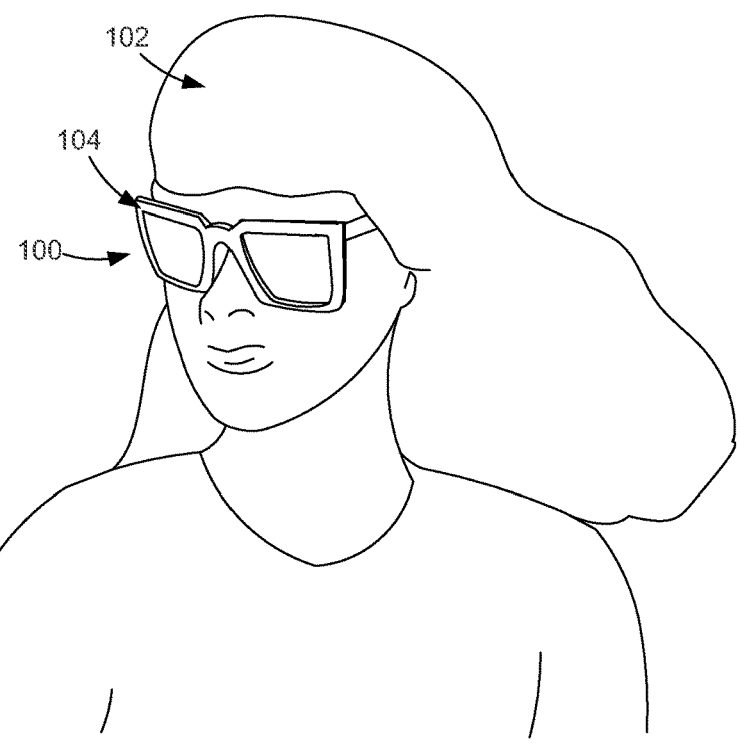
FIG. 1 shows a see-through head-mounted display device as worn by a user in accordance with an embodiment of the present disclosure.

FIG. 1 shows an example embodiment of a near-eye display system in the form of a see-through head-mounted display device 100 worn by a user 102. The head-mounted display device 100 may be used, for example, to display augmented reality images via a see-through display in which displayed virtual objects are viewable along with physical objects in a real-world background scene. While described in the context of a head-mounted display device, it will be understood that the disclosed embodiments may be used with any other suitable near-eye display device. As discussed above, misalignment of the display optics of the head-mounted display device with the user's eye may result in vignetting of the field of view and other optical effects. Thus, for proper viewing, a user may adjust the head-mounted display to position the display at a target viewing position relative to the user's eyes. The see-through head-mounted display device 100 may include a frame 104 to enable the user to position the device at the target viewing location. For example, the target viewing location may correspond to a region in space inside of which an eye may properly perceive displayed images.

Figure 2:
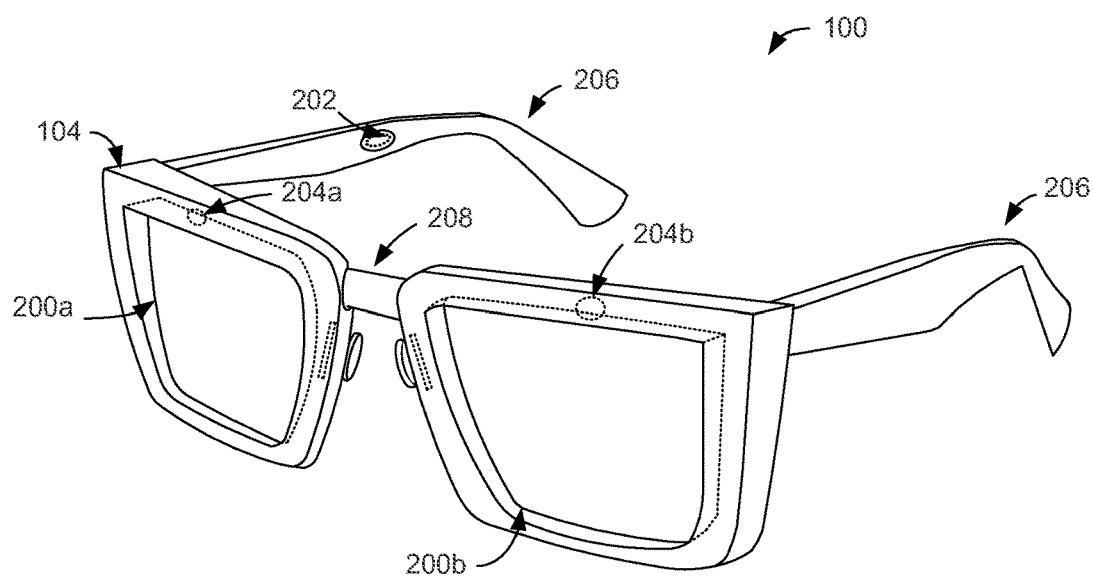
FIG. 2 schematically shows the see-through head-mounted display device of FIG. 1 in accordance with an embodiment of the present disclosure.

FIG. 2 shows a schematic depiction of the see-through head-mounted display device 100 of FIG. 1. The depicted see-through head-mounted display device 100 includes a right see-through display 200a and a left see-through display 200b. Each see-through display may be configured to both display images to a user and allow a user to view the real-world environment. For example, each see-through display may include a display device configured to emit display light through an optical configuration to an eye of a user. The optical configuration may also allow light from the real-world environment and/or positioning light to reach the eye of the user. For example, the positioning light may enable the user and/or the see-through head-mounted display device to locate a position of the eye in order to provide feedback regarding adjustments that may be made to position the see-through displays at a target viewing location. FIG. 2 schematically illustrates speakers 202 that may be used to output acoustic information to a user, such as audio feedback relating to the adjustments and/or eye positioning described above. Such acoustic information may take any suitable form, including but not limited to a computer-generated voice output in an appropriate language (e.g. as selected by a user), tones or other sounds that are not specific to any language, and/or any other suitable sounds. In some embodiments, other types of outputs may be provided by the see-through head-mounted display device 100, such as haptic/tactile outputs to assist the user in adjusting the see-through head-mounted display device.

The see-through head-mounted display device 100 includes a right eye camera 204a and a left eye camera 204b, schematically illustrated in FIG. 2. The cameras 204a and 204b may be configured to capture images of each eye of a user for determining a gaze direction. For example, the eye cameras 204a and 204b may receive gaze-detection light (e.g., from a glint light source) and/or positioning light (e.g., from one or more positioning light sources) as reflected off of the eyes of the user. Utilizing the light reflected off of the eye, the eye cameras 204a and 204b may track a gaze of a user and/or determine a relative position of the eye to optics of the see-through head-mounted display device 100 based on the position and movement of the reflected gaze-detection and/or positioning light. If the relative position of the eye to optics of the see-through head-mounted display device 100 is determined to be misaligned with respect to the eye, the see-through head-mounted display device may provide feedback to the user to inform the user of the misalignment. In some embodiments, the see-through head-mounted display device may determine an adjustment that may be made to align the see-through head-mounted display device with the eye and perform the adjustment automatically or recommend the adjustment to the user.

The head-mounted display device 100 may determine an adjustment to perform or recommend in any suitable manner. For example, the head-mounted display system may determine an offset of the user's eye (or pupil or other anatomical feature of the user's eye) from the target viewing position for that eye, and may output a recommendation based upon a known or determined relationship between operation of an adjustment mechanism and a change in the location of the user's eye relative to the target viewing position as a function of the operation of the adjustment mechanism. Any suitable adjustment may be recommended and/or performed. For example, some devices may offer multiple adjustment mechanisms (horizontal, vertical, angular, etc.). In such devices, multiple recommendations may be output, or multiple adjustments performed, in some situations, depending upon the adjustments to be made.

The see-through displays 200a and 200b and the eye cameras 204a and 204b may be positioned at a viewing location relative to the eye via one or more securing mechanisms of the frame 104. For example, as illustrated in FIG. 2, the frame 104 may be supported by ears of a user via ear pieces 206 and by the nose of a user via nose bridge 208 to reduce slippage of the frame 104. It is to be understood that supports, such as the ear pieces 206, nose pieces, and nose bridge 208, illustrated in FIG. 2 are exemplary in nature, and the see-through displays of the head-mounted see-through display device may be positioned at the viewing location via any suitable mechanism. For example, additional supports may be utilized, and/or one or more of the supports illustrated in FIG. 2 may be removed, replaced, and/or augmented to position the see-through displays at the viewing location. Furthermore, see-through displays may be positioned in a viewing location by mechanisms other than supports that physically touch a user without departing from the scope of this disclosure.

FIG. 3 schematically shows an example of a see-through head-mounted display system 300 for assisting a user in adjusting a position of one or more components of the see-through head-mounted display system to a target location relative to an eye 302 of a user 304. As described in more detail with respect to FIGS. 5A and 5B, the see-through head-mounted display system 300 may include one or more optical elements for directing display light and/or positioning light to the eye 302 of the user 304. The optical elements may include a focusing element 306, such as a freeform prism, and a beam splitter 308, such as a polarizing beam splitter and/or hot mirror. It will be understood that separate see-through display systems 300 may be used for left eye and right eye displays, as shown in FIG. 2.

The see-through head-mounted display system 300 includes any suitable number of positioning light sources 310 for directing positioning light toward the eye 302 of the user 304. For example, the see-through head-mounted display system 300 may include two or more spatially and/or angularly separated positioning light sources 310. The positioning light source(s) 310 may be positioned in any suitable location relative to other elements of the see-through head-mounted display system 300. For example, as illustrated in FIG. 3, positioning light source(s) 310 may be positioned substantially adjacent to or otherwise near a micro-display 312 and/or an eye-tracking camera 314. Accordingly, the positioning light source(s) 310 may emit positioning light $L_p(E)$ from the same or a substantially similar side of an optical element (e.g., beam splitter 308 and/or an associated prism) as the micro-display 312 and/or eye-tracking camera 314. Each of the positioning light source(s) 310 may be configured to emit visible and/or infrared light through a narrow exit pupil of the light sources to direct light to a particular location relative to the user's eye 302.

In some embodiments, one or more of the positioning light sources 310 may be configured to emit visible light to enable the user 304 to determine correct positioning based on a perceived attribute of the positioning light $L_p(E)$. For example, a numerical aperture of the positioning light sources 310 may be controlled by adjusting an aperture stop near the positioning light sources or by using a light source with a well-defined cone angle (e.g., a laser light focused by a lens). The numerical aperture of the positioning light sources 310 may be controlled to enable light to reach a target location of a user's pupil relative to the display of the see-through head-mounted display system 300. Accordingly, the user 304 may determine that an adjustment is to be made to the display to position the display in the target viewing location if the positioning light or a portion of the positioning light is not perceived.

In embodiments in which multiple positioning light sources are utilized, visible light may be emitted from two different angles configured to converge at a target pupil location. Accordingly, the user 304 may determine that an adjustment is to be made to the display if the positioning light is not perceived and/or if multiple points of light are perceived. In such examples, each of the positioning light sources 310 may be configured to emit any suitable pattern of light (e.g., ring, a point, a line, etc.) detectable by the user. The positioning light emitted from one of the positioning light sources 310 may be a different color than positioning light emitted from another of the positioning light sources 310 such that a user may determine a relative location of perceived light from each source, indicating a type of adjustment to be made to the position of the see-through head-mounted display system. The emitted colors may also be configured to produce a different color when combined (e.g., when the user perceives the positioning light from the target pupil location) to indicate correct positioning of the see-through head-mounted display system to the eye. The positioning light sources 310 may continue emitting positioning light $L_p(E)$ throughout adjustment in order to provide real-time feedback relating to the success of positional adjustments. For example, if a user detects no change or an increased divergence in the positioning light while moving the see-through display away from the eye, the user may determine that movement toward the eye will position the head-mounted display device at the target viewing location.

Positioning light $L_p(E)$ may alternatively be directed outside of a target pupil location, such that perception of the positioning light indicates that adjustment of the head-mounted display device is recommended. Positioning light sources that are configured to direct positioning light outside of a target pupil location may additionally be used along with positioning light sources that are configured to direct positioning light to a target pupil location. In such embodiments, the positioning light sources may be configured to emit positioning light having different colors dependent upon the location at which the light is directed. For example, positioning light directed outside of a target pupil location may have a first color, while positioning light directed to a target pupil location may have a second, different color. Accordingly, the perception of the first color by the user may indicate misalignment of the head-mounted display device. The positioning light sources 310 may be configured to emit a gradient of colors such that a saturation and/or hue of the perceived light may indicate an extent of misalignment. For example, positioning light directed to the target pupil location may have a yellow hue, positioning light directed just outside of the target pupil location may have an orange hue, and positioning light directed furthest away from the target pupil location may have a red hue. It is to be understood that any number and combination of colors and directed locations of positioning light may be utilized to inform the user of the presence and/or degree of misalignment of the head-mounted display device.

Precision of the alignment system described above may be affected by the number of positioning light sources and the size of the user's pupil. In particular, the precision of the alignment system may increase with an increase in the number of positioning light sources and/or an increase in pupil size. In order to increase the pupil size of the user, a luminance of one or more of the positioning light sources and/or any other illumination light source may be increased.

As discussed above, the positioning light source(s) 310 may be configured to emit visible light to enable a user to determine whether the head-mounted display device is misaligned based on perceived attributes of the visible positioning light. In additional or alternative embodiments, the positioning light source(s) 310 may emit visible and/or infrared light for detection at an eye-tracking camera 314 or other imaging device to determine a position of the user's eye 302 relative to a target position. For example, the one or more positioning light sources 310 may be configured to illuminate the eye 302 such that the eye-tracking camera 314 may image the eye 302 and/or a pattern formed by positioning light $L_p(E)$ on the eye. In some embodiments, the positioning light sources 310 may be configured to direct light onto the sclera as an addition or alternative to the pupil of the eye 302 in order to provide a more reflective surface for the positioning light $L_p$.

Similarly to the embodiments discussed above regarding user perception of the positioning light, the eye-tracking camera 314 may image the reflected positioning light $L_p(R)$ to determine attributes of the reflected positioning light $L_p(R)$ indicative of misalignment of the head-mounted display system 300 relative to the eye 302. For example, a numerical aperture of two or more of the positioning light sources 310 may be controlled to direct two or more beams of positioning light and/or one or more positioning light patterns such that the positioning light converges onto a sclera of the user's eye 302. If the reflected beams and/or light patterns imaged by the eye-tracking camera 314 converge, the head-mounted display system 300 may be determined to be positioned in the target viewing location. Conversely, if multiple points of light and/or a non-converging pattern is imaged by the eye-tracking camera 314, the head-mounted display system 300 may be determined to be positioned outside of the target viewing area (e.g., too close or too far away from the user's eye 302).

In response to detected misalignment, the head-mounted display system 300 may provide feedback for the user regarding an adjustment of the head-mounted display system. For example, the micro-display 312 may be driven to display instructions to the user through the head-mounted display system 300 for moving the head-mounted display system in relation to the user's eye 302. As one eye may be closer to the head-mounted display than another, the head-mounted display system 300 may provide feedback relating to misalignment and/or adjustment of the head-mounted display system for each eye and associated display (e.g., displays 200a and 200b of FIG. 2). For example, feedback for each eye may be presented on a respective display (e.g., feedback for a left eye may be presented on a left display, while feedback for a right eye may be presented on a right display). Feedback via a display device may be provided simultaneously or sequentially for each eye.

As discussed above with respect to FIG. 2, feedback may be provided via one or more speakers and/or haptic feedback devices of the head-mounted display system in addition to or as an alternative to feedback displayed on the display device(s). The feedback may provide any suitable level of detail regarding the misalignment, including whether or not the head-mounted display system is misaligned, a degree of misalignment of the head-mounted display system, and/or a manner in which the head-mounted display system may be adjusted to align the head-mounted display system with a target viewing location.

FIG. 4 schematically shows an embodiment of an eye-positioning system of a see-through head-mounted display system 400 including a plurality of eye-tracking cameras 402a and 402b and a positioning light source 404. Although not illustrated in FIG. 4, it is to be understood that one or more additional positioning light sources may be included in the see-through head-mounted display system 400. As the distance between eye-tracking cameras 402a and 402b is fixed, the location of the eye 302 may be determined by evaluating the angles of incidence of light reflected from the eye 302 on each of the eye-tracking camera 402a and 402b (e.g., via triangulation). The relative position of the eye 302 with respect to the eye-tracking cameras 402a and 402b may be compared to a target position to determine whether the head-mounted display system 400 is misaligned.

Figure 5A:
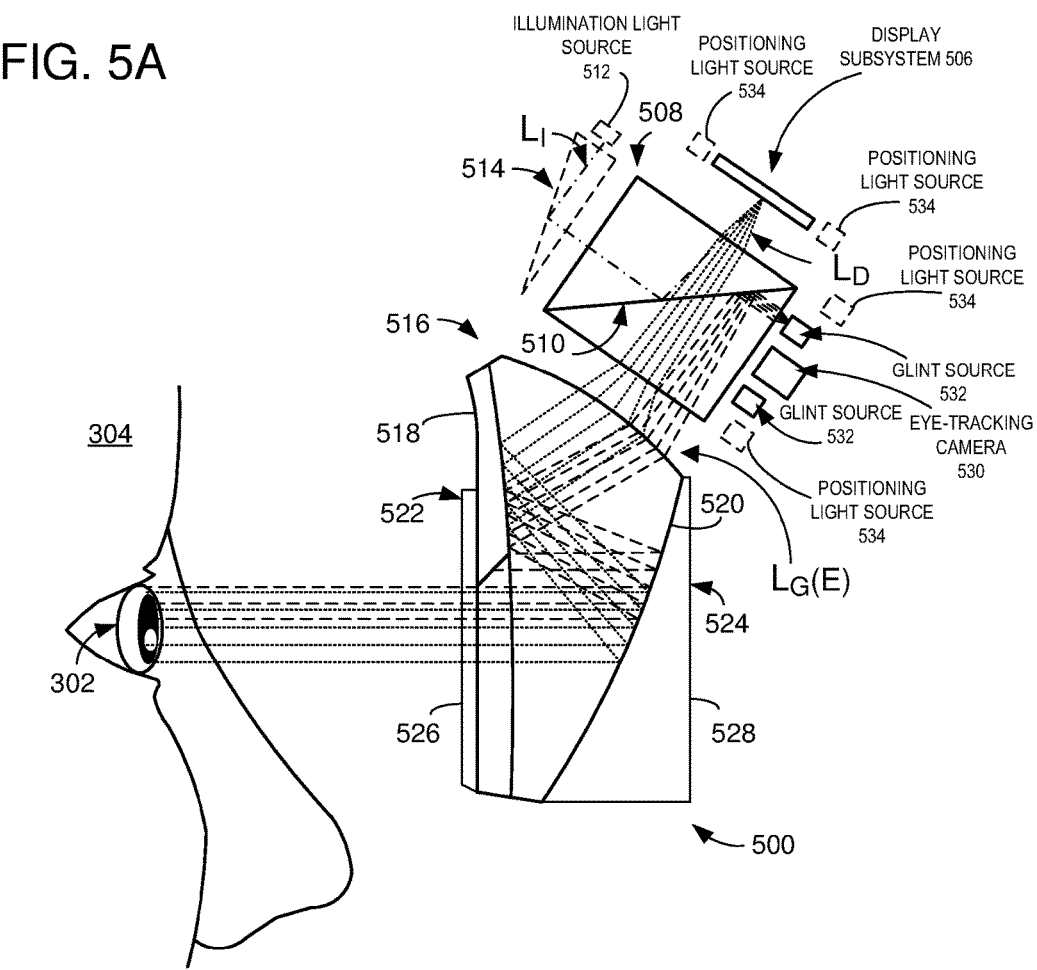
FIG. 5A schematically shows a see-through display and optical paths for directing display light and gaze-detection light to an eye of a user in accordance with an embodiment of the present disclosure.

Turning now to FIG. 5A, an example embodiment of optical elements of a see-through display 500 is depicted. The see-through display 500 includes an optical configuration for directing display light, gaze-detection light, and/or positioning light to an eye 302 of a user 304. The see-through display 500 includes a display subsystem, shown schematically at 506, configured to produce an image for display to user 304. For example, the display subsystem 506 may correspond to the micro-display 312 of FIGS. 3 and 4. The display subsystem 506 may comprise any suitable components for producing images for display, including but not limited to a micro-display and one or more light sources. Display light, $L_D$, from display subsystem 506 travels along the display optical path (indicated by rays originating at the display subsystem 506) to reach the user's eye 302. It will be understood that separate see-through displays 500 may be used for left eye and right eye displays, as shown in FIG. 2.

The display subsystem 506 may direct light through an illumination prism 508 including a beam splitter 510 (e.g., a polarizing beam splitter or hot mirror) configured to transmit the display light from the display device. For example, the beam splitter 510 may be configured to pass visible light while reflecting infrared light. In some embodiments, the display subsystem 506 may include a reflective micro-display, such as a liquid crystal on silicon (LCoS) display. In other embodiments, the display subsystem may include an emissive micro-display, such as organic light emitting diode (OLED) array display types, inorganic light emitting diode (iLED) array display types, and/or any other suitable micro-display. The beam splitter 510 may include a polarizing beam splitter, and an illumination light source 512 may be configured to emit illumination light, $L_I$, into the illumination prism 508 (e.g., from an optical wedge 514 to the polarizing beam splitter). The illumination light source 512 may comprise one or more light sources, such as an RGB LED array, one or more white LEDs (e.g., with a color filter arrangement), and/or any suitable illumination light source configuration. As the polarizing beam splitter splits the illumination light into beams of different polarization, the polarizing beam splitter may be configured to reflect a portion of the polarized illumination light toward the LCoS display for illuminating the display. The display may reflect the illumination light to generate the display light, $L_D$, and the polarizing beam splitter may be configured to transmit a portion of the display light toward the eye 302 of the user 304.

The see-through display 500 includes a freeform prism 516 for directing light from the illumination prism 508 to the eye 302 of the user 304. The freeform prism 516 may have positive optical power and comprise at least three surfaces, each surface being non-planar and non-spherical. For example, the freeform prism 516 may include a user-facing surface 518 having a total internal reflective coating in order to direct the light into the user's eye 302. The freeform prism 516 may also include an outward-facing surface 520 opposite the user-facing total internal reflective surface, the outward-facing surface 520 having a coating that is highly reflective for infrared light and partially reflective for visible light. For example, the outward-facing surface 520 may be more reflective for infrared light than for visible light. In some embodiments, the outward-facing surface 520 may be configured to reflect substantially all infrared light and a portion of visible light.

The see-through display 500 may include one or more compensators positioned around the freeform prism 516. As illustrated in FIG. 5A, the see-through display 500 includes a user-facing compensator 522 positioned on an eye-side of the freeform prism and an outward-facing compensator 524 positioned on an environment-side of the freeform prism. Accordingly, the freeform prism 516 is positioned between the user-facing compensator 522 and the outward-facing compensator 524, such that light from the environment passes through the outward-facing compensator 524, then through the freeform prism 516, and then through the user-facing compensator 522 before reaching the eye 302. An eye-side surface 526 of the user-facing compensator 522 (e.g., the surface of the user-facing compensator 522 that is closest to the eye 302) may be substantially parallel to an environment-side surface 528 of the outward-facing compensator 524 (e.g., the surface of the outward-facing compensator 524 that is furthest away from the eye 302). The compensators 522 and 524 are configured to have a substantially similar index of refraction as the freeform prism and to compensate for distortion of light from the real-world environment of the user 304 caused by the optical power of the freeform prism 516. The distortion compensation provided by the compensators 522 and 524 may be affected by the index of refraction of an adhesive used to couple the compensators to the freeform prism 516. Therefore, adhesives having indices of refraction closer to that of the freeform prism 516 and/or compensators 522 and 524 may enable a greater amount of distortion compensation than adhesives having different indices of refraction. Similarly, thinner layers of adhesives may provide less distortion.

Figure 5B:
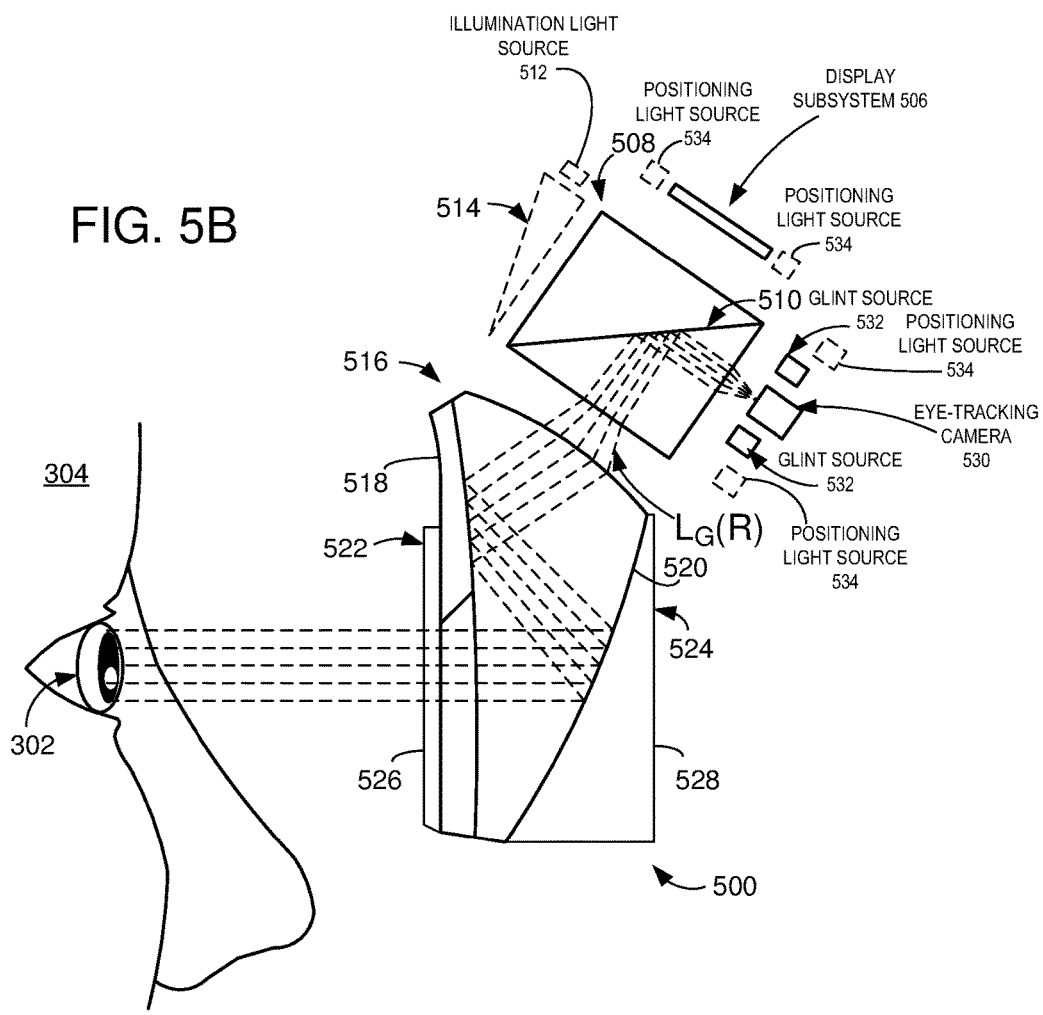
FIG. 5B schematically shows a see-through display and optical paths for receiving gaze-detection light at a camera in accordance with an embodiment of the present disclosure.

The see-through display 500 also includes an eye tracking system comprising an imaging device, such as one or more eye tracking cameras 530, and one or more glint sources 532 (e.g. one or more infrared positioning light sources) configured to produce light for reflection from the user's eye. Emitted gaze-detection light, $L_G(E)$, from the glint sources 532 may travel along a gaze-detection optical path (indicated by rays originating at one of the glint sources 532) through at least a portion of the optics utilized for the display optical path. Turning briefly to FIG. 5B, emitted gaze-detection light, $L_G(E)$, from the glint sources 532 may reflect from the user's eye 302, such that reflected gaze-detection light, $L_G(R)$, is returned to eye tracking camera 530 via a reverse gaze-detection optical path (e.g. along at least a portion of the gaze-detection optical path in a reverse direction). In the depicted example, images from the user's eye are diverted away from the display subsystem 506 and toward the eye tracking camera 530 by the beam splitter 510 located immediately before the camera along the reverse display optical path.

As shown in FIGS. 5A and 5B, the eye tracking camera 530 images, or receives reflected gaze-detection light, L$_G$(R), through a first side of the illumination prism 508 and the display subsystem 506 emits the display light, L$_D$, through a second, different side of the illumination prism 508. Accordingly, the eye tracking camera 530 and the display subsystem 506 may interact with sides that are adjacent and/or substantially perpendicular to one another. In some embodiments, the glint source 532 may emit the gaze-detection light, L$_G$(E), through the first side of the illumination prism 508. Thus, the glint source may be positioned on a substantially similar side of the illumination prism as the eye tracking camera 530. In additional or alternative embodiments, the glint source 532 may emit the gaze-detection light, L$_G$(E), through the second side of the illumination prism 508 and/or from any other suitable location. Although exemplary optical paths to the user's eye 302 and to the eye tracking camera 530 are depicted in FIGS. 5A and 5B, the optical paths may take any other suitable form.

The eye tracking system (e.g., the eye tracking camera 530 and/or the glint sources 532) may detect a location of the eye and/or anatomical structures thereof (e.g. a pupil of the eye 302). The eye tracking system may also detect a location of reflections from glint sources 532 in the image data acquired via eye tracking camera 530, and from this information determine a direction in which the eye is gazing. Furthermore, the eye tracking camera 530 may detect attributes of positioning light emitted from one or more positioning light sources 534. As depicted in FIGS. 5A and 5B, the positioning light sources 534 may occupy any of a plurality of optional locations relative to the display subsystem 506 and/or the eye tracking camera 530. It is to be understood that the positioning light sources 534 may additionally or alternatively occupy other locations within the see-through display 500. The positioning light sources 534 may direct positioning light through both the illumination prism 508 and the freeform prism 516 to the eye 302 of the user 304.

Figure 6:
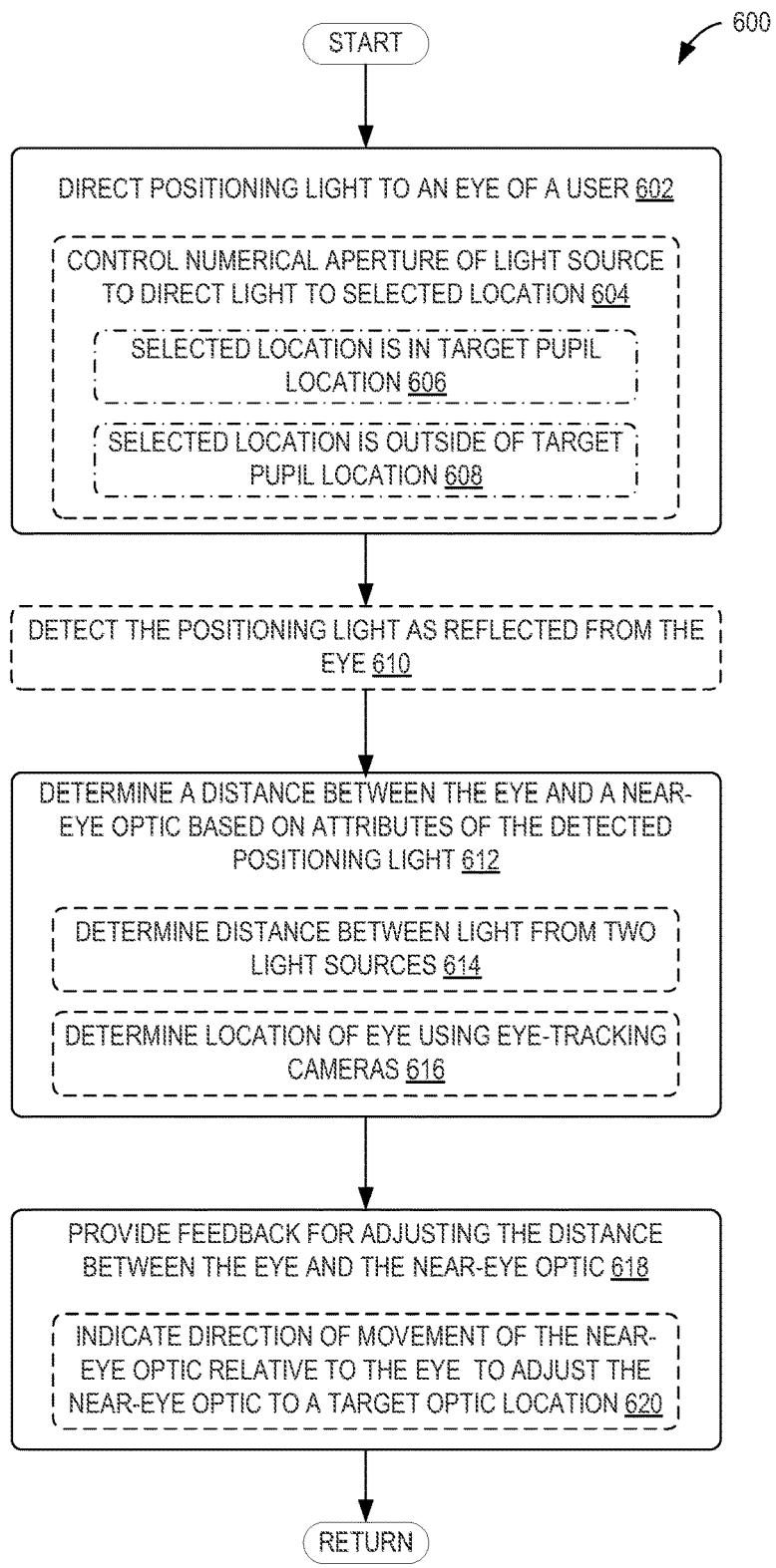
FIG. 6 shows a flow diagram of a method of detecting eye location in a head-mounted display system in accordance with an embodiment of the present disclosure.

FIG. 6 is a flow chart of a method 600 for detecting eye location in a head-mounted display system. For example, elements of method 600 may be performed using the see-through head-mounted display system 300 of FIG. 3 and/or the see-through head-mounted display system 400 of FIG. 4. The method 600 includes directing positioning light to an eye of a user, as indicated at 602. The direction of light to the eye of the user may include controlling an aperture of a positioning light source to direct the positioning light to a selected location at 604. As indicated at 606, the selected location may optionally be a target pupil location. For example, positioning light may be directed to a target pupil location so that the user may detect the positioning light when the user's eye is positioned in a correct location relative to the head-mounted display system. The positioning light may be additionally or alternatively be directed to a target pupil location to indicate a target location of a pupil for analysis by an eye-tracking camera. As indicated at 608, the selected location may optionally be outside of a target pupil location. For example, positioning light may be directed outside of a target pupil location so that the user may detect the positioning light when the user's eye is positioned in an incorrect location (e.g., the head-mounted display system is positioned outside of a target viewing location). Additionally or alternatively, the positioning light may be directed outside of the target pupil location in order to target a more reflective surface than the pupil for assisting the eye-tracking camera with positioning an eye of the user.

As discussed above, the positioning light may optionally be detected as reflected from the eye by an eye-tracking camera at 610. The method 600 includes determining a distance between the eye and a near-eye optic of the head-mounted display system based on attributes of the detected positioning light at 612. For example, the attributes of the detected positioning light may be determined based on user perception and/or detection of reflected positioning light by one or more eye tracking cameras. The attributes may include determining a distance between light from two or more light sources, as indicated at 614. The distance between the eye and the near-eye optic may also be determined by determining a location of the eye using eye tracking camera, as indicated at 616 and described above with respect to FIG. 4.

Upon determining the distance, the method 600 includes providing feedback for adjusting the distance between the eye and the near-eye optic at 618. For example, feedback may be provided to the user to perform the adjustment if the distance between the positioning light from a first light source and the positioning light from a second light source as reflected from the eye is above a threshold. The feedback may optionally include indicating a direction of movement of the near-eye optic relative to the eye to adjust the near-eye optic to a target optic location, as indicated at 620. For example, one or more speakers, displays, and/or haptic feedback devices of the head-mounted display system may output instructions to assist the user in adjusting the distance between the eye and the near-eye optic to achieve the target positioning.

During use, a distance between an eye of a user and an associated display of a see-through head-mounted display system may change. As discussed above, an appearance of objects displayed on the displays may be altered responsive to such changes in distance between the eye and the displays. The methods and systems described herein assist a user in determining misalignment of the see-through head-mounted display system and correcting said misalignment in order to provide a comfortable user experience.

Figure 7:
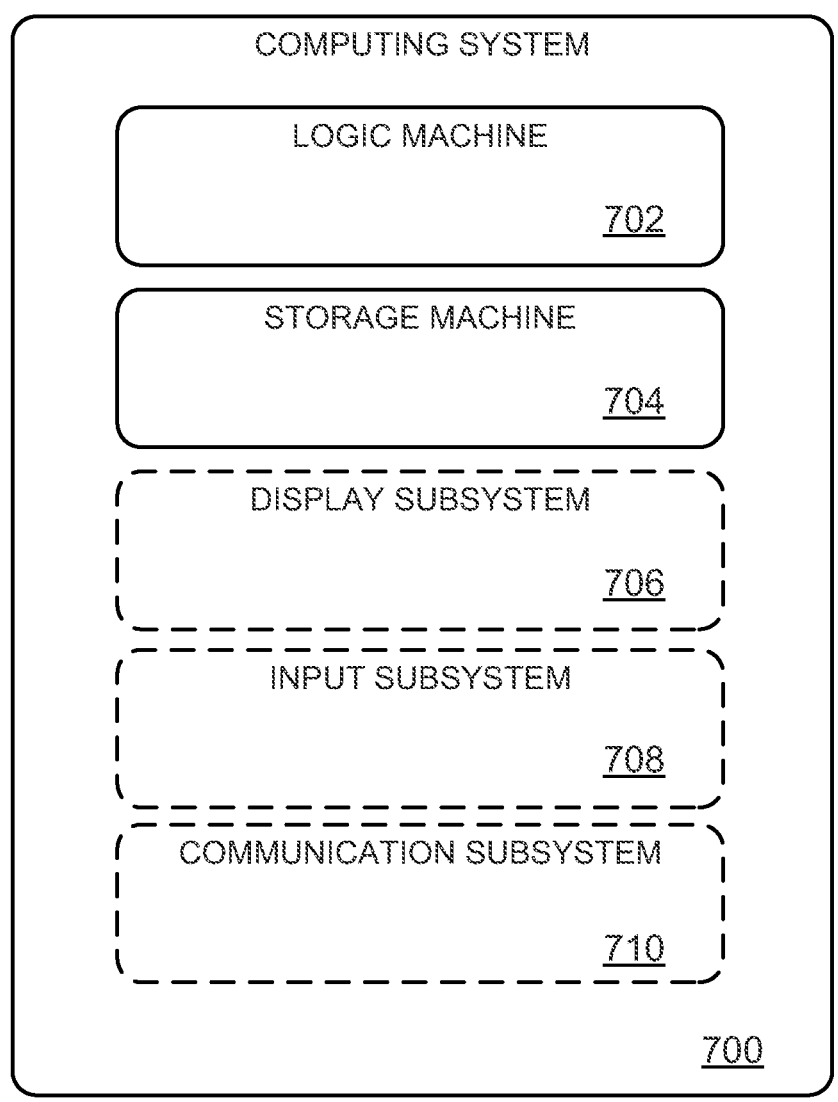
FIG. 7 shows a block diagram of a computing system in accordance with an embodiment of the present disclosure.

FIG. 7 schematically shows a non-limiting embodiment of a computing system 700, for example a computing system of head-mounted display device 100 of FIG. 1. Computing system 700 is shown in simplified form. Computing system 700 may take the form of one or more see-through head-mounted display systems, personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute machine-readable instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold machine-readable instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program-and application-specific integrated circuits (PASIC/ASICs), program-and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions stored by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. For example, display subsystem 706 may correspond to one or more elements of the see-through displays 200*a* and 200*b* of FIG. 2. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of detecting eye location for a head-mounted display system, the method comprising:
   directing display light to a particular eye of a wearer of the head-mounted display system through an optical element, the display light perceivable by the wearer as an image;
   while the optical element is in place for directing the display light, directing positioning light from one or more positioning light sources to the particular eye of the wearer via the optical element, the positioning light being different from the display light;
   detecting the positioning light reflected from the particular eye of the wearer using an eye-tracking camera;
   determining a distance between the particular eye and a current position of a near-eye optic of the head-mounted display system based on attributes of the detected positioning light;

automatically determining, via a computer and without wearer input, an offset distance between the current position of the near-eye optic and a target position of the near-eye optic, the target position of the near-eye optic being a target distance from the particular eye; and automatically providing, from the computer, feedback to the wearer of the head-mounted display system for self-adjusting the distance between the particular eye and a center of the near-eye optic to decrease the offset distance.

2. The method of claim 1, wherein the feedback for self-adjusting the distance between the particular eye and the center of the near-eye optic includes visual feedback provided to the user via the near-eye optic.

3. The method of claim 1, wherein the feedback for self-adjusting the distance between the particular eye and the center of the near-eye optic includes audio feedback provided to the user via the head-mounted display system.

4. The method of claim 1, wherein directing positioning light to the particular eye of the user includes directing positioning light from a first light source and a second light source to the particular eye.

5. The method of claim 4, wherein determining the distance between the particular eye and the current position of the near-eye optic of the head-mounted display system includes determining a distance between positioning light from the first light source and positioning light from the second light source as reflected from the particular eye.

6. The method of claim 5, further comprising providing feedback to the user to perform the adjustment if the distance between the positioning light from the first light source and the positioning light from the second light source as reflected from the particular eye is above a threshold.

7. The method of claim 1, wherein directing positioning light further comprises controlling a numerical aperture of a light source to direct light to a selected area of the particular eye of the user.

8. The method of claim 1, wherein the feedback indicates a direction of movement of the center of the near-eye optic relative to the particular eye of the wearer.

9. The method of claim 1, wherein the feedback for self-adjusting the distance between the particular eye and the center of the near-eye optic includes haptic feedback provided to the wearer via the head-mounted display system.

10. A head-mounted display system for detecting eye location, the head-mounted display system comprising:
a display device including an optical element;
an eye-tracking camera;
a positioning light source;
a logic machine; and
a storage machine configured to store instructions executable by the logic machine to:
direct display light to a particular eye of a wearer of the head-mounted display system via the optical element of the display device, the display light perceivable by the wearer as an image;
while the optical element is in place for directing the display light, direct positioning light from the positioning light source to the particular eye of the wearer via the optical element, the positioning light being different from the display light;
detect the positioning light reflected from the particular eye of the wearer using the eye-tracking camera;
determine a distance between the particular eye and a current position of a near-eye optic of the head-mounted display system based on attributes of the detected positioning light;
automatically determine without wearer input an offset distance between the current position of the near-eye optic and a target position of the near-eye optic, the target position of the near-eye optic being a target distance from the particular eye; and
automatically provide feedback to the wearer of the head-mounted display system for self-adjusting the distance between the particular eye and a center of the near-eye optic to decrease the offset distance via the display device.

11. The system of claim 10, wherein the optical element includes a freeform prism configured to direct the positioning light to the particular eye of the wearer.

12. The system of claim 10, wherein the positioning light source includes one or more infrared light sources.

13. The system of claim 10, wherein the positioning light source includes one or more visible light sources.

14. The system of claim 10, wherein the positioning light source includes two positioning light sources that are spatially and angularly separated from one another.

15. The system of claim 10, wherein the eye-tracking camera is one of a plurality of cameras, and wherein determining the distance between the particular eye and the current position of the near-eye optic of the head-mounted display system includes measuring angles of incidence of positioning light reflected from the particular eye as received by each of the plurality of eye-tracking camera to determine a location of the particular eye based on the measured angles.

* * * * *